(12) United States Patent
Steinke et al.

(10) Patent No.: US 10,740,091 B1
(45) Date of Patent: Aug. 11, 2020

(54) FEATURE ADVERTISING FOR NONLINEAR NONDISRUPTIVE UPGRADES

(71) Applicant: EMC IP Holding Company LLC, Hopkinton, MA (US)

(72) Inventors: Ron Steinke, Tacoma, WA (US); Scott D. Haskin, Renton, WA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/263,225

(22) Filed: Jan. 31, 2019

(51) Int. Cl.
*G06F 8/656* (2018.01)
*G06F 8/658* (2018.01)
*H04L 12/24* (2006.01)

(52) U.S. Cl.
CPC .............. *G06F 8/656* (2018.02); *G06F 8/658* (2018.02); *H04L 41/082* (2013.01)

(58) Field of Classification Search
CPC ......... G06F 8/656; G06F 8/658; H04L 41/082
USPC ......................................... 717/121, 168–178
See application file for complete search history.

(56) References Cited

U.S. PATENT DOCUMENTS

| | | | | |
|---|---|---|---|---|
| 6,502,076 B1 * | 12/2002 | Smith | .................... | G06Q 30/02 705/14.54 |
| 7,984,304 B1 * | 7/2011 | Waldspurger | ......... | G06F 21/565 713/187 |
| 8,561,043 B2 * | 10/2013 | Ayguade | ............... | G06F 8/4442 711/118 |
| 8,972,929 B2 * | 3/2015 | Fahmy | .................... | G06F 9/451 717/107 |
| 9,753,718 B1 * | 9/2017 | Carter | .................... | G06F 9/4406 |
| 2003/0145315 A1 * | 7/2003 | Aro | ........................ | G06F 9/541 717/170 |
| 2006/0053048 A1 * | 3/2006 | Tandetnik | .............. | G06Q 30/02 705/14.49 |
| 2007/0106627 A1 * | 5/2007 | Srivastava | ............. | G06Q 10/10 706/20 |
| 2007/0169118 A1 * | 7/2007 | Choi | ........................ | G06F 8/60 717/174 |
| 2009/0249318 A1 * | 10/2009 | Ayguade | ............... | G06F 8/4442 717/151 |
| 2010/0088673 A1 * | 4/2010 | Chen | ..................... | G06F 8/4442 717/110 |
| 2012/0185843 A1 * | 7/2012 | Burke | ....................... | G06F 8/61 717/174 |
| 2019/0129804 A1 * | 5/2019 | Liu | ..................... | G06F 21/6218 |

* cited by examiner

*Primary Examiner* — Marina Lee
(74) *Attorney, Agent, or Firm* — Amin, Turocy & Watson, LLP

(57) ABSTRACT

Advertising of nonlinear nondisruptive upgrades is presented herein. The method comprises in response to establishing a network connection to a group of networked devices, determining a software product feature associated with a software product based on tag data; generating an advertising bit mask representing the software product feature; and broadcasting the advertising bit mask.

20 Claims, 11 Drawing Sheets

US 10,740,091 B1

FEATURE ADVERTISING FOR NONLINEAR NONDISRUPTIVE UPGRADES

TECHNICAL FIELD

The subject disclosure generally relates to embodiments for providing non-disruptive software upgrades across disparate releases of software in execution, where running clusters of network devices contain nodes that execute more than one version of a software package or software product.

BACKGROUND

In a distributed network of networked devices supporting nondisruptive upgrades requires that each device comprising the distributed network of networked devices running different versions of a software package or a software product communicate in compatible versions of network protocol, and restrict globally viewable persistent on-disk states to those that can be correctly parsed and handled by all devices in the network of networked devices. Implementing such logic typically requires that each device be able to determine what features are supported by other devices in the distributed network.

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

Figure 1:
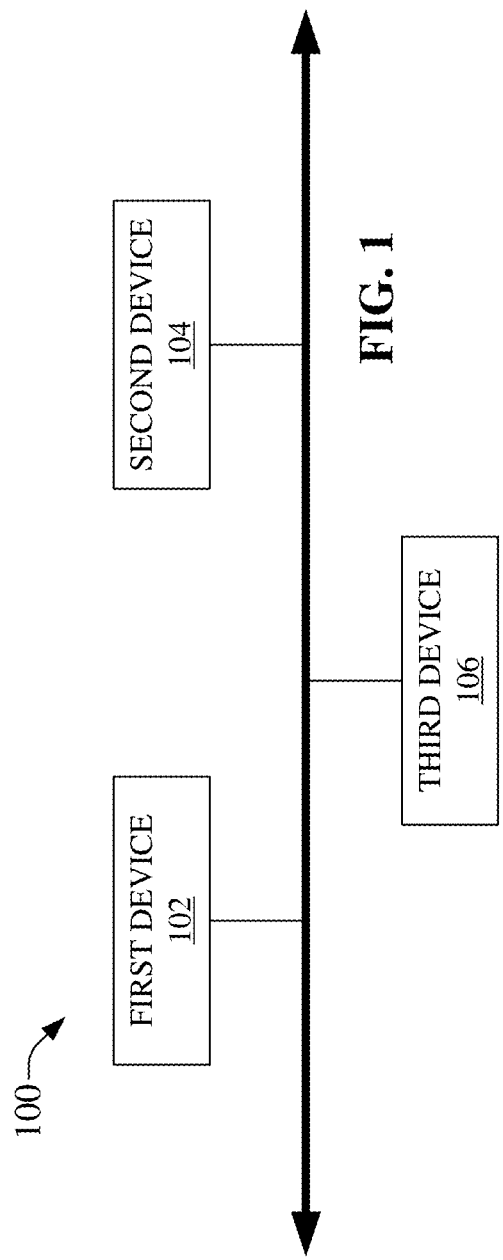
FIG. 1 illustrates a block diagram of a network of distributed devices for providing advertising for nonlinear nondisruptive upgrades, in accordance with various embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

As noted above in a distributed network of networked devices supporting nonlinear nondisruptive upgrades (NDU) can require that each device comprising the distributed network of networked devices running different versions of a software product communicate in compatible versions of network protocol, and restrict globally viewable persistent on-disk states to that which can be correctly parsed and handled by all nodes in the system. Implementing such logic typically can require each device to be able to determine what 'features' are supported by other devices in the distributed network.

It should be noted in this context that 'features' can include bug fixes which can change network protocols or persistent states, and as such when upgrading software products within a distributed network of networked devices there is generally no guarantee that the introduction of new features will be ordered linearly, with features only being added with a new major or minor version of a software product. Instead, later maintenance releases of an earlier version of the software product can contain features that may have been absent in an earlier release of a later version. Accordingly, this can rule out using release versions to determine what current features a specific device in the distributed network of network devices supports. It has been found, that using a dictionary indicating which maintenance release for each version that the specific device received a feature can be inadequate, as the exact release in which a feature will first appear in is not necessarily determined before the first release containing the feature is released for public distribution.

To overcome the foregoing issues the subject disclosure provides that each device comprising a distributed network of networked devices can advertise a set or group of features to all other devices in the distributed network of devices as a mask, such as a bit mask. Typically, advertisement of features can take place, for example, when network connections are established between each of the devices in the distributed network. By advertising the features while network connections are being established between devices comprising the distributed network, network overhead can be kept to a minimum. However, as those skilled in the art will appreciate, the advertisement of salient features by devices to groups of other devices comprising the distributed network can take place at any instance of time that is deemed practicable to do so.

In order to avoid advertising every feature that has been added to a software product since its inception, it is contemplated that each feature can comprise two alphanumerical strings, a generation string representing a generation number associated with a software product, and a feature string representative of a feature within the generation of the software product. In accordance with various embodiments, the two alphanumerical strings can be two respective integer values (e.g., binary values, decimal values, octal values, hexadecimal values, . . . ) representing a generation integer value and a feature integer value associated with the software product. In addition to advertising features, it is also contemplated that each device can also advertise a default generation value. As envisaged and as general rules, a device will not typically advertise features for any future generation less than or equal to the default generation for which the device has the complete set or grouping of features. Similarly, a device will typically not advertise features for any future generation greater than the default generation for which it has no features. By following the foregoing general rules, advertisements broadcast by each device in the distributed network of networked devices can be limited to a few feature generations for which the particular device has a partial feature set, and the features in these generations can be compactly advertised as per-generation bit masks.

The goals of the subject application are to ensure that any device in a distributed network of networked devices is be able to determine whether any feature it cares about is implemented by a particular version of a software product; and upgrade checks for a particular feature is be able to be deleted from a code base once the feature is old enough to have been implemented in all versions of the software product, and for which the feature no long needs continued support for purposes of interoperability.

While the availability of features typically cannot be determined simply from software product release numbers, tagging individual features with release numbers can still be useful and beneficial. Tags can, for example, supply guidance as to which features can safely have their upgrade checks removed. Additionally, using tags can make changing legacy interfaces simpler.

As described above, every feature can be given both a first value representing a release number (e.g., first alphanumerical string) and a second value representing a specific feature (e.g., second alphanumerical string) within a grouping of features that can be used to distinguish features from other disparate features within a particular release of a software product. The associations between grouping of features, release numbers, and/or features within the grouping of features can be maintained in a globally accessible data structure that can allow collaborative editing of its content and structure by users, e.g., a wiki website. Such a globally accessible data structure can aid to avoid collisions at branch and merge time, and build time checks can be used to discover collisions that might otherwise evade detection.

As contemplated, individual versions of software products can advertise their enabled feature set or feature grouping through a variety of network protocols, both in user space and/or the kernel. Advertisements can comprise bit masks representing both a release version of a particular build of a software product, as well as a list or grouping of features for individual release versions.

A bit mask representing the list or grouping of features can be provided for all releases less than or equal to a current version release for which the current version does not have a complete list or group of features, along with all releases greater than the current version release for which the current version has at least one feature. Such a bit mast representing the list or grouping of features can provide sufficient information for any other version of a software product operational or in execution on a disparate device in the grouping of networked devices to determine the presence or absence for support on the current version for any feature for which a different version of the software product is aware.

As versions of a software product can tend to have support for a complete set of features for older releases, using bit masks to advertise a list or a grouping of features operational on a particular device in the grouping of networked devices allows correct feature advertisement by future versions of the software product which will eventually remove upgrade checks for these new features. Once a software product version has become feature complete in a release less than or equal to its own release, that feature no longer needs to be included in the bit mask advertisement (e.g., the feature no longer needs to be included in the advertised version). By the time that upgrade checks for a feature can be removed, the feature can also be removed from the list or grouping of features by code that facilitates advertisements of the version.

With reference to the Figures. FIG. 1 depicts a distributed network of devices 100 comprising first device 102, second device 104, and third device 106 that can be communicatively coupled with one another via wired and/or wireless infrastructures to form a network of devices. In accordance with an embodiment, first device 102, second device 104, and third device 106 can each be executing a software product, such as an operating system. First device 102 can be executing a first version of the software product (e.g., version 11), second device 104 can be executing a second version of the software product (e.g., version 7), and third device 106 can be executing a third version of the software product (e.g., version 3), wherein the first version of the software product, the second version of the software product, and/or the third version of the software product are disparate versions of the software product. Further, first device 102 can be executing a first release of the first version of the software product (e.g., release 8), second device 104 can be executing a second release of the second version of the software product (e.g., release 6), and third device 106 can be executing a third release of the third version of the software product (e.g., release 4). As with the disparate versions of the software product operational on the first device 102, second device 104, and third device 106, each of the first release, the second release, and the third release operational on each of the first device 102, the second device 104, and the third device 106 can be different. Additionally, first device 102 can be executing a first feature grouping or first set of features (e.g., feature grouping 29) associated with the first version and first release of the software product, second device 104 can be executing a second feature grouping or a second set of features (e.g., feature grouping 29) associated with the second version and second release of the software product, and third device 106 can be executing a third feature grouping or a third set of features (e.g., feature grouping 20) associated with the third version and third release of the software product. Similar to the disparate versions and the different releases of the software product, each of the feature grouping or feature set extant on each of first device 102, second device 104, and/or third device 106, can be dissimilar from one another.

In accordance with the foregoing and the disclosed subject matter, each respective device (e.g., first device 102, second device 104, and third device 106) can advertise a set or group of features to all other devices in the distributed network of devices as a mask, such as a bit mask. For example, first device 102, at the time that network connections are being initiated between first device 102, second device 104, and third device 102, can advertise, as a first bit mask, the fact first device 102 is currently operational and using a first version, a first release, and a first feature grouping of the software product. Similarly, second device 104, at the time network connections are being initiated between the various devices, can advertise, as a second bit mask, the fact that second device 104 is currently operational using a second version, a second release, and a second feature grouping of the software product; and third device 106, when network connections are being initiated, can advertise, as a third bit mask, the fact that third device 106 is currently operational using a third version, a third release, and a third feature grouping of the software product.

To avoid advertising all features that have been added to a software product since its inception on each of first device 102, second device 104, and third device 106, each respective feature grouping disseminated by first device 102, second device 104, and third device 106 as respective bit masks can comprise two alphanumeric strings, a generation string representing a generation number associated with a software product, and a feature string representative of a feature within the generation of the software product. The two alphanumeric strings can be two respective integer values representing a generation integer value and a feature integer value associated with the software product.

In addition to advertising features, first device 102, second device 104, and/or third device 106 can each respectively advertise within the bit mask a default generation value. Since, as noted earlier, a device generally should not advertise features for any future generation less than or equal to the default generation for which the device has a complete set or grouping of features; and further since a device should typically not advertise features for any future generation greater than the default generation for which it has no features. Each of first device 102, second device 104, and third device 106 can facilitate determination of their respective default generation values for a software product based on whether or not the device has a complete set or grouping of features that are at least equal to the default generation; and/or based on whether or not the device has any features that exceed the default generation value.

Figure 2:
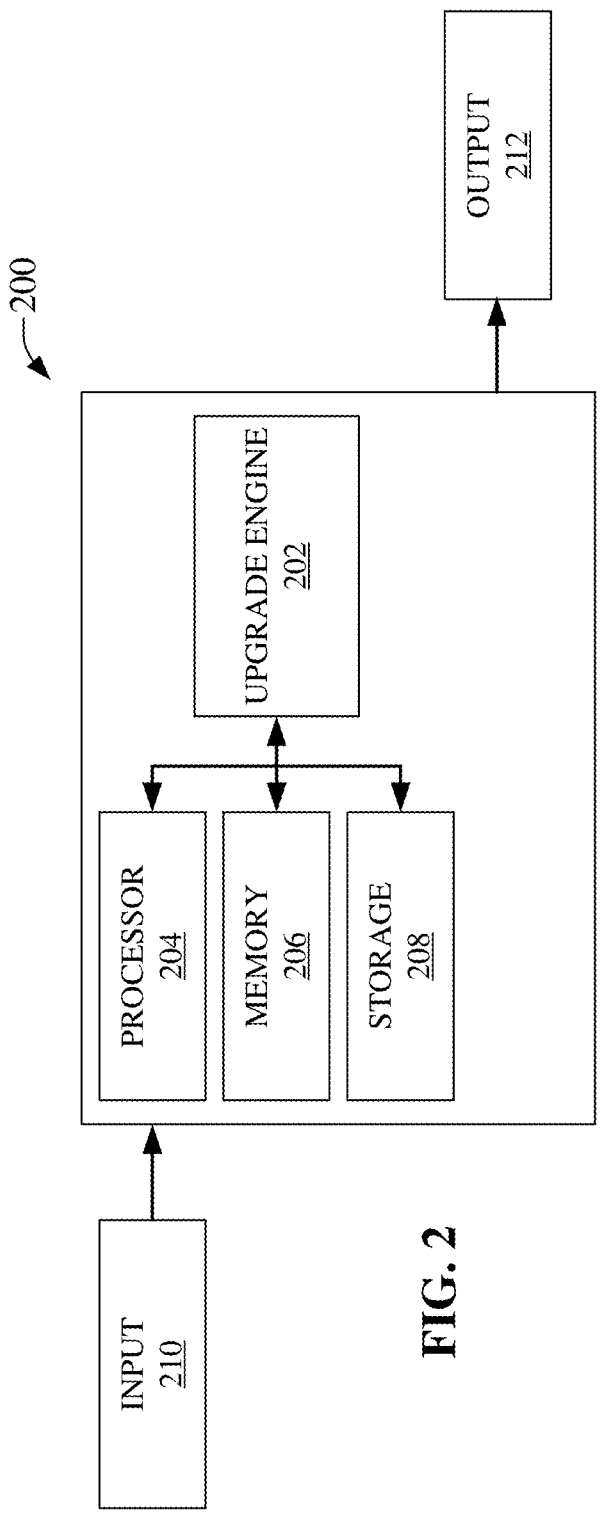
FIG. 2 illustrates a block diagram of a system for providing advertising for nonlinear nondisruptive upgrades, in accordance with various example embodiments.

FIG. 2 depicts a system 200 that provides for advertising for nonlinear nondisruptive upgrades, in accordance with various example embodiments. System 200 can for purposes of illustration, can be any type of mechanism, machine, device, facility, apparatus, and/or instrument that includes a processor and/or is capable of effective and/or operative communication with a wired and/or wireless network topology. Mechanisms, machines, apparatuses, devices, facilities, and/or instruments that can comprise system 200 can include tablet computing devices, handheld devices, server class computing devices, machines, and/or databases, laptop computers, notebook computers, desktop computers, cell phones, smart phones, consumer appliances and/or instrumentation, industrial devices and/or components, hand-held devices, personal digital assistants, multimedia Internet enabled phones, multimedia players, and the like.

System 200 can comprise upgrade engine 202 that can be in operative communication with processor 204, memory 206, and storage 208. Upgrade engine 202 can be in communication with processor 204 for facilitating operation of computer-executable instructions or machine-executable instructions and/or components by upgrade engine 202, memory 206 for storing data and/or computer-executable instructions and/or machine-executable instructions and/or components, and storage 208 for providing longer term storage of data and/or machine-readable instructions and/or computer-readable instructions. Additionally, system 200 can also receive input 210 for use, manipulation, and/or transformation by upgrade engine 202 to produce one or more useful, concrete, and tangible result, and/or transform one or more articles to different states or things. Further, system 200 can also generate and output the useful, concrete, and tangible result and/or the transformed one or more articles as output 212.

System 200 in conjunction with upgrade engine 202 can advertise a set or group of features to all other devices in a distributed network of devices. Typically, upgrade engine 202 can advertise the set or group of features when network connections are being established between each of the devices comprising the distributed network of devices. Upgrade engine 202, by advertising the features while network connections are being established can ensure that network overhead is kept to a minimum.

Upgrade engine 202, in order to avoid advertising every feature that has been added to a software product operational on system 200 since the inception of the software product, can generate and use alphanumeric strings, wherein each software product feature associated with the software product can comprise at least two alphanumeric strings, a generation string that can represent a generation associated with a software product, and a feature string representative of a feature within the generation of the software product. In accordance with various embodiments, the two alphanumeric strings can be two respective integer values representing a generation integer value and a feature integer value associated with the software product.

Additionally and/or alternatively, upgrade engine 202 can also identify a default generation value. As noted earlier, since a device, such as system 200 in collaboration with upgrade engine 202, typically will not advertise features for any future generation less than or equal to the default generation value for which system 200 has a complete set or grouping of features, the default generation value identification undertaken by upgrade engine 202 can be based on whether or not system 200 has a complete set or grouping of features that are at least equal to the default generation value. Similarly, since the device (e.g., system 200) will typically not advertise features for any future generation greater than the default generation value for which system 200 has no features, the default generation value identification undertaken by upgrade engine 202 can be based on whether or not system 200 has any features that exceed the default generation value.

Upgrade engine 202 can generate a mask (e.g., a bit mask) comprising a first alphanumeric string—generation string representative of a generation number associated with the software product; and a second alphanumeric string—feature string representative of a feature within the generation of the software product. Additionally and/or alternatively, upgrade engine 202 can also generate the mask to include a default generation value that can be determined based on whether or not whether or not system 200 has a complete set or grouping of features that are at least equal to the default generation value and/or whether or not system 200 has any features that exceed the default generation value.

Upgrade engine 202 can also facilitate system 200 to broadcast the mask comprising the first alphanumeric string, the second alphanumeric string, and/or the default generation value at a time when system 200 is establishing network connections between devices comprising a distributed network of devices.

Figure 3:
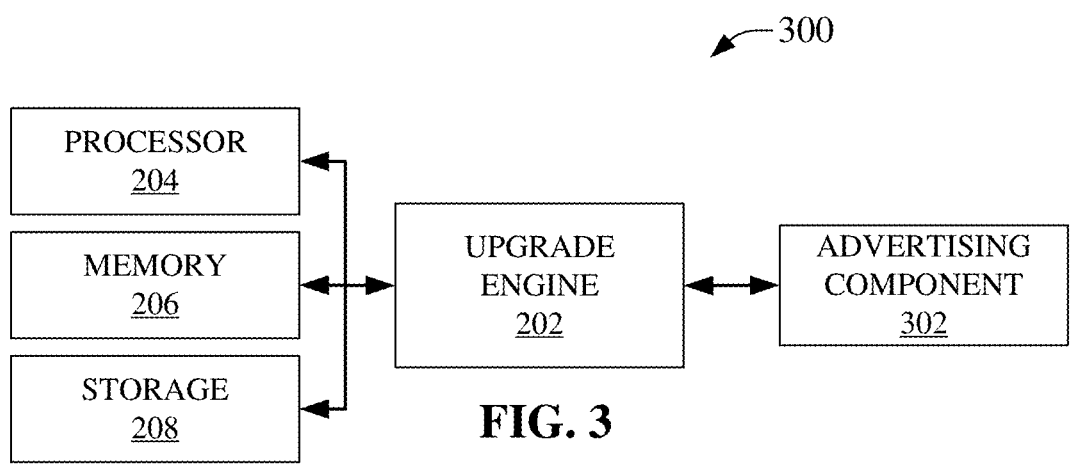
FIG. 3 illustrates an additional system for providing advertising for nonlinear nondisruptive upgrades, in accordance with various example embodiments.

FIG. 3 provides further depiction of system 200, now depicted as system 300, provides for advertising for nonlinear nondisruptive upgrades, in accordance with various example embodiments. System 300, as illustrated, can comprise advertising component 302 that in collaboration with upgrade engine 202, processor 204, memory 206, and storage 208 can advertise a set or group of features when network connections are being established between each device comprising a distributed network of devices. Advertising component 302, in order to avoid advertising every feature that has been added to a software product operational on system 200 can employ alphanumeric strings, wherein each software product feature identified and associated with a software product can comprise at least two alphanumeric strings: a generation string representative of a generation associated with a software product; and a feature string representative of a feature within the generation of the software product. The two alphanumeric strings can be two respective integer values representing a generation integer value and a feature integer value associated with the software product.

Figure 4:
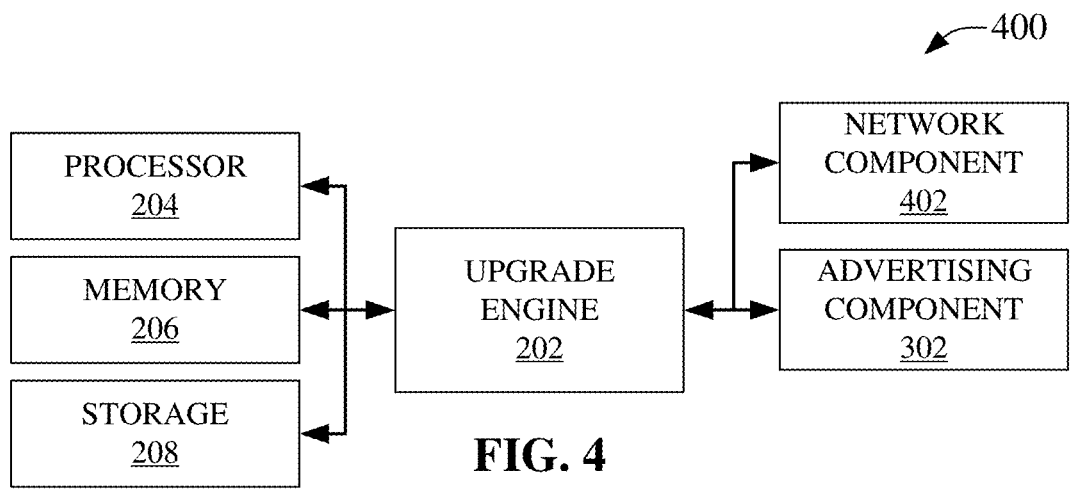
FIG. 4 illustrates yet a further system for providing advertising for nonlinear nondisruptive upgrades, in accordance with various example embodiments.

FIG. 4 provides further illustration of system 200, now referenced as system 400, that provides for advertising for nonlinear nondisruptive upgrades, in accordance with various example embodiments. System 400, as depicted, can comprise network component 402 that can operate in conjunction with advertising component 302, upgrade engine 202, processor 204, memory 206, and storage 208. Network component 402 can determine whether or not network connections are being established between one or more devices comprising a distributed network of devices and system 200. Network component 402 on determining that network connections are being established between the one or more devices comprising the distributed network of devices and system 200, network component 402 can facilitate broadcast of the mask, generated by advertising component 302, to the one or more devices in the distributed network of devices.

Figure 5:
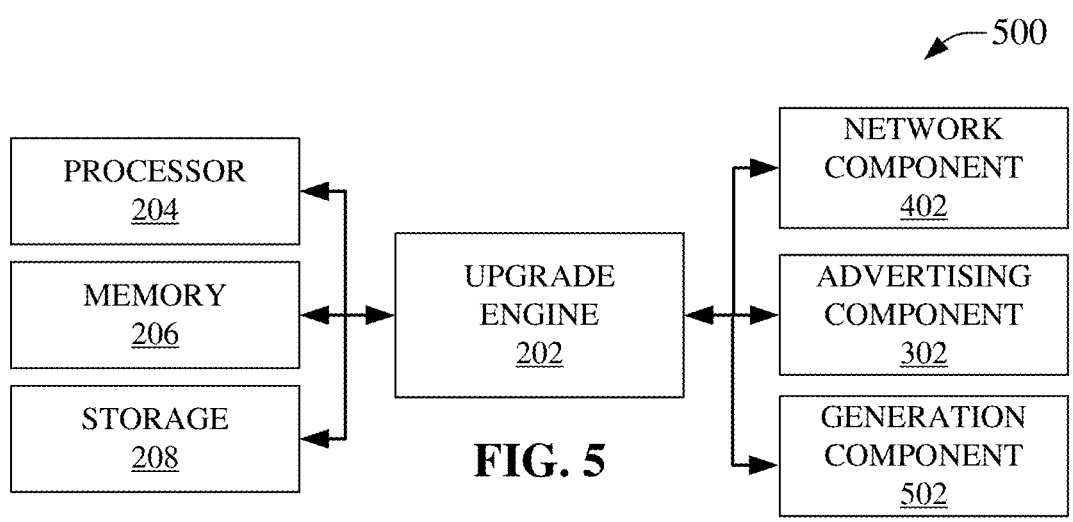
FIG. 5 depicts a further system for providing advertising for nonlinear nondisruptive upgrades, in accordance with various example embodiments.

FIG. 5 provides additional illustration of system 200, now referenced as system 500, that provides for advertising for nonlinear nondisruptive upgrades, in accordance with various example embodiments. System 500, as illustrated, can comprise generation component 502 that can operate in collaboration with advertising component 302 and/or network component 402. Generation component 502, in order to avoid advertising every feature that has been added to a software product since the installation of the software product on system 200, can generate alphanumeric strings. Generation component 502, for each software product feature associated with the software product, can generate at least two alphanumeric strings: a first alphanumeric string or generation string that can represent a generation associated with a software product, and a second alphanumeric string or feature string that can represent a feature within the generation of the software product. The first alphanumeric string and the second alphanumeric string can be integer values.

Figure 6:
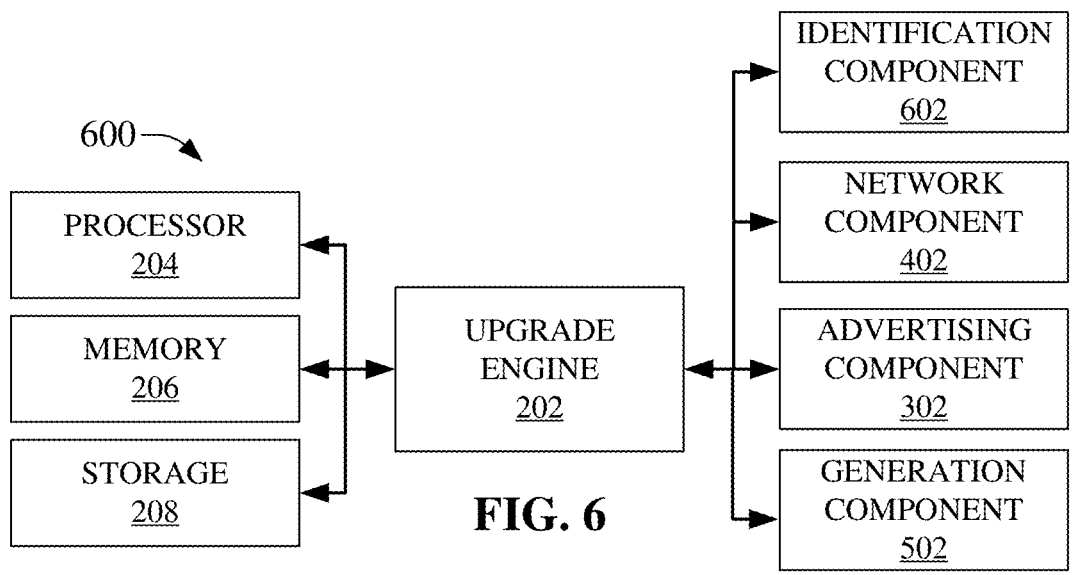
FIG. 6 illustrates another system for providing advertising for nonlinear nondisruptive upgrades, in accordance with various example embodiments.

FIG. 6 provides yet further depiction of system 200, referenced now as system 600, that provides for advertising for nonlinear nondisruptive upgrades, in accordance with various example embodiments. System 600, as depicted, can comprise identification component 602 that can operate in conjunction with generation component 502, network component 402, advertising component 302, upgrade engine 202, processor 204, memory 206, and/or storage 208 to identify a default generation value. As noted above, since a device typically will not advertise features for any future generation less than or equal to the default generation value for which system 200 has a complete set or grouping of features, the default generation value identification undertaken by identification component 602 can be based on whether or not a complete set or grouping of features that are at least equal to the default generation value exist on system 200. Similarly, since a device will typically not advertise features for any future generation greater than the default generation value for which no features exist on system 200, the default generation value identification undertaken by identification component 602 can be based on whether or not there are any features that exceed the default generation value.

Figure 7:
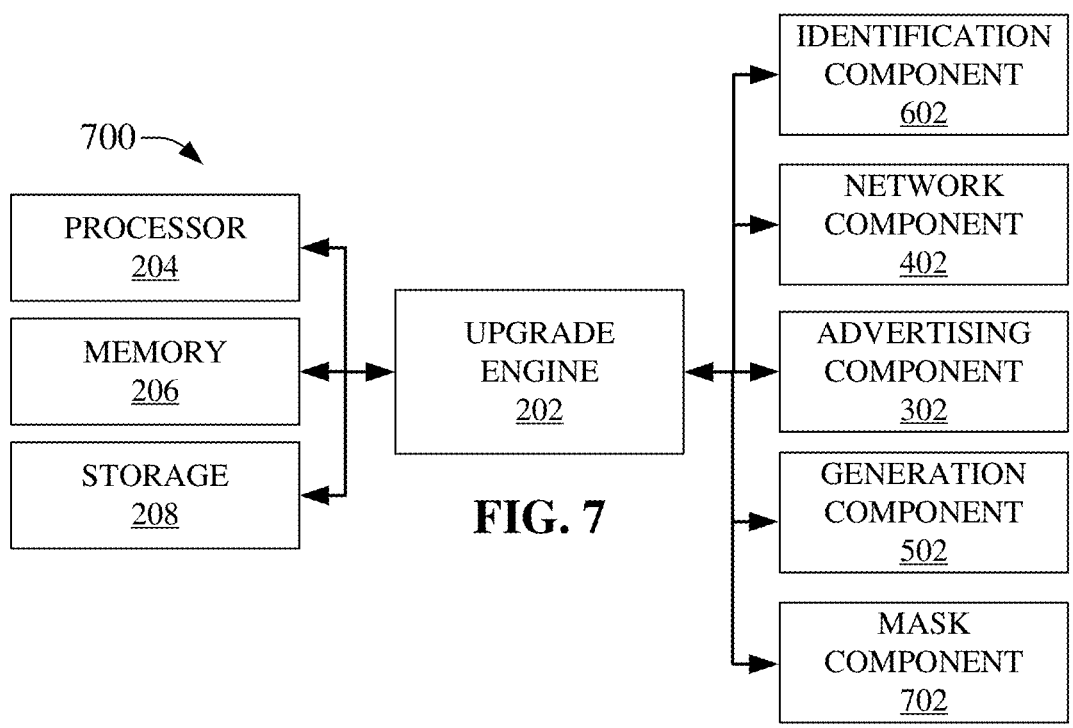
FIG. 7 illustrates a yet another system for providing advertising for nonlinear nondisruptive upgrades, in accordance with various example embodiments.

FIG. 7 provides additional depiction of system 200, referenced as system 700, that provides for advertising for nonlinear nondisruptive upgrades, in accordance with various example embodiments. System 700 can include mask component 702 that in conjunction with identification component 602, generation component 502, network component 402, advertising component 302, upgrade engine 202, processor 204, memory 206, and/or storage 208 can generate a mask (e.g., a bit mask) comprising a first alphanumeric string—generation string representative of a generation number associated with the software product; and a second alphanumeric string—feature string representative of a feature within the generation of the software product. Additionally and/or alternatively, mask component 702 can also generate the mask to include a default generation value that can be determined based on whether or not whether or not a complete set or grouping of features that are at least equal to the default generation value has been identified and/or whether or not there are any features that exceed the default generation value. Mask component 702 can thereafter facilitate system 200 to broadcast the generated mask comprising the first alphanumeric string, the second alphanumeric string, and/or the default generation value at a time when system 200 is establishing network connections between devices comprising a distributed network of devices.

Figure 8:
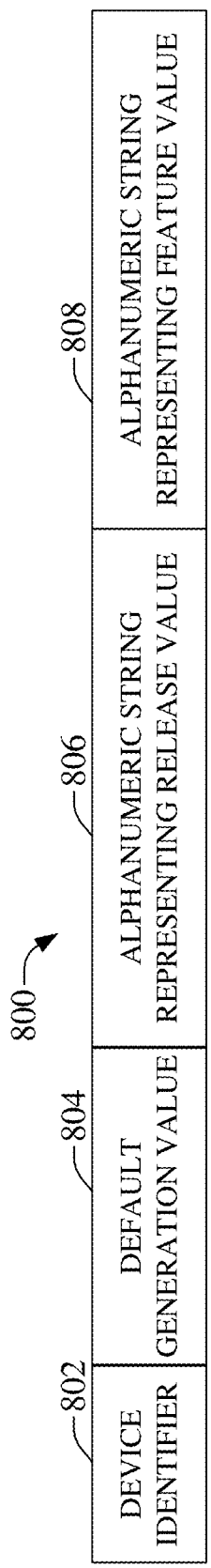
FIG. 8 illustrates alphanumeric strings that can be used to provide advertising for nonlinear nondisruptive upgrades, in accordance with various example embodiments.

FIG. 8 provides illustration of example data structure of data structures 800 for providing advertising for nonlinear nondisruptive upgrades. Data structure of data structures 800 illustrates a globally accessible data structure that can allow collaborative editing of its content and structure by users. Data structure 800 can aid in avoiding collisions at branch and merge time, and build time checks can be used to discover collisions that might otherwise evade detection through use of data structure 800. As illustrated, data structure 800 can comprise a device identification value 802, a default generation value 804, a first alphanumeric string representative of the release value for a software product 806, and a second alphanumeric string representing a feature value for the software product 808. The device identification value 802 can be based for example on a media access control value associated with most networked device. The default generation value 804 can be a value determined in accordance with the functions and facilities provided by identification component 602. The first alphanumeric string representing the release value of the software product 806 and the second alphanumeric string representing a feature value for the software product 808 can be determined in accordance with the facilities and functionalities provided by generation component 502.

Figure 9:
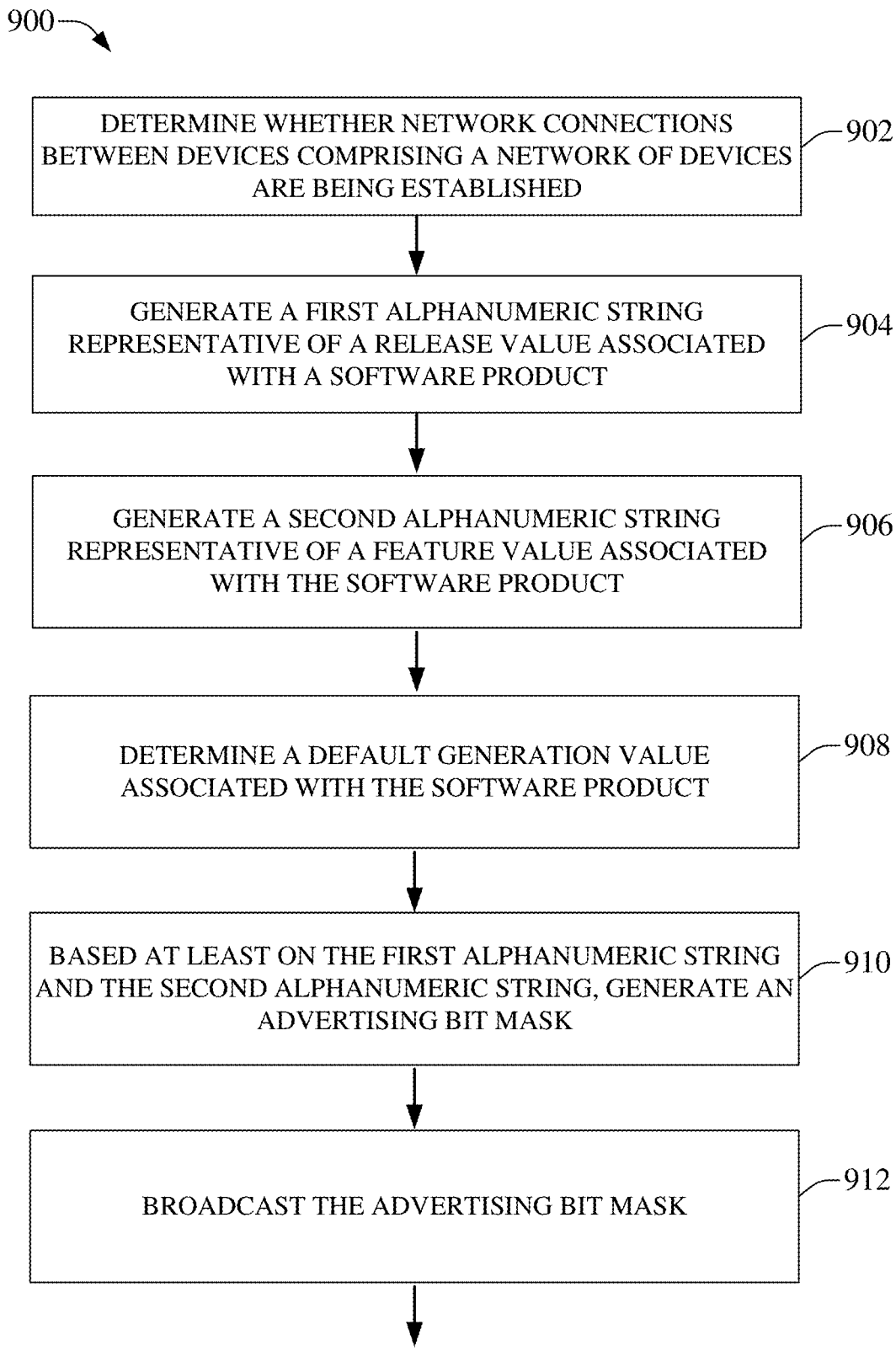
FIG. 9 illustrates a flow chart of a method for providing advertising for nonlinear nondisruptive upgrades, in accordance with various example embodiments.

FIG. 9 illustrates a methodology for performing operations corresponding to system 200, in accordance with various example embodiments. For simplicity of explanation, the methodologies are depicted and described as a series of acts. It is to be understood and appreciated that various embodiments disclosed herein are not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring now to FIG. 9, a methodology 900 for providing advertising for nonlinear nondisruptive upgrades is illustrated, in accordance with various example embodiments. The method 900 can commence at act 902 where a device, such as system 200 (using the facilities and/or functionalities of upgrade engine 202), can determine whether network connections between devices comprising a network of connected devices are being established. At 904 a first alphanumeric string representative of a release value associated with a software product can be generated. At 906 a second alphanumeric string representative of a feature value associated with the software can be generated. The first alphanumeric string and the second alphanumeric string can be generated based on a records stored to a globally accessible data structure that can allow collaborative editing of the data structure and the content of the data structure by users of the data structure. At 908 a default generation value associated with the software product extant on the device can be determined. As noted earlier, the default generation value determined by the device can be based on whether or not a complete set or grouping of features that are at least equal to a default generation value exist on the device; and/or whether or not there are any features extant on the device that exceed the default generation value. At 910 an advertising bit mask can be generated. In accordance with embodiments, the advertising bit mask can be based at least on the first alphanumeric string and/or the second alphanumeric string. At 912 the advertising bit mask can be broadcast to the network of connected devices.

The disclosed systems and methods, in accordance with various embodiments, provide a system, apparatus, or device comprising: a processor; and a memory that stores executable instructions that, when executed by the processor, facilitate performance of operations. The operations can comprise: determining a product feature associated with a software product based on tag data; generating an advertising bit mask representing the product feature; and broadcasting the advertising bit mask.

Additional operations can comprise initiating the determining in response to a network connection being established to a device of a network of devices; and retrieving the tag data from a data structure stored on a database device of database devices.

The tag data can represent software product version data and/or software product release data. The data structure can be a globally accessible data structure that permits collaborative editing of the globally accessible data structure, and/or collaborative editing of content of the globally accessible data structure.

In accordance with further embodiments, the subject disclosure describes a method, comprising a series of acts that can include: determining, by a device comprising a processor, a software product feature associated with a software product based on tag data; generating, by the device, an advertising bit mask representing the software product feature; and broadcasting, by the device, the advertising bit mask.

Additional acts that can be performed can comprise: initiating, by the device, the determining in response to a network establishment to a network of devices, and/or retrieving, by the device, the tag data from a data structure stored on a database device of database devices.

The advertising bit mask can represent at least a software product release data and software product feature data associated with the software product. The tag data can represent software product release data associated with the software product. The data structure can be a globally accessible data structure that permits collaborative editing of the globally accessible data structure, and/or collaborative editing of content of the globally accessible data structure, wherein the content can represent software product version data associated with the software product.

In accordance with still further embodiments, the subject disclosure describes a machine readable storage medium, a computer readable storage device, or non-transitory machine readable media comprising instructions that, in response to execution, cause a computing system comprising at least one processor to perform operations. The operations can comprise: in response to establishing a network connection to a group of networked devices, determining a software product feature associated with a software product based on tag data; generating an advertising bit mask representing the software product feature; and broadcasting the advertising bit mask. Further operations can include: obtaining the tag data from a data structure stored on a database device of a group of database devices.

The tag data can represent software product version data, software product release data, and/or software product feature data. The tag data can also represent software product release data or software product feature data associated with the software product feature. The data structure can be a globally accessible data structure that permits collaborative editing of the globally accessible data structure, and/or the data structure can be a globally accessible data structure that permits collaborative editing of content of the globally accessible data structure, wherein the content comprises the tag data.

Figure 10:
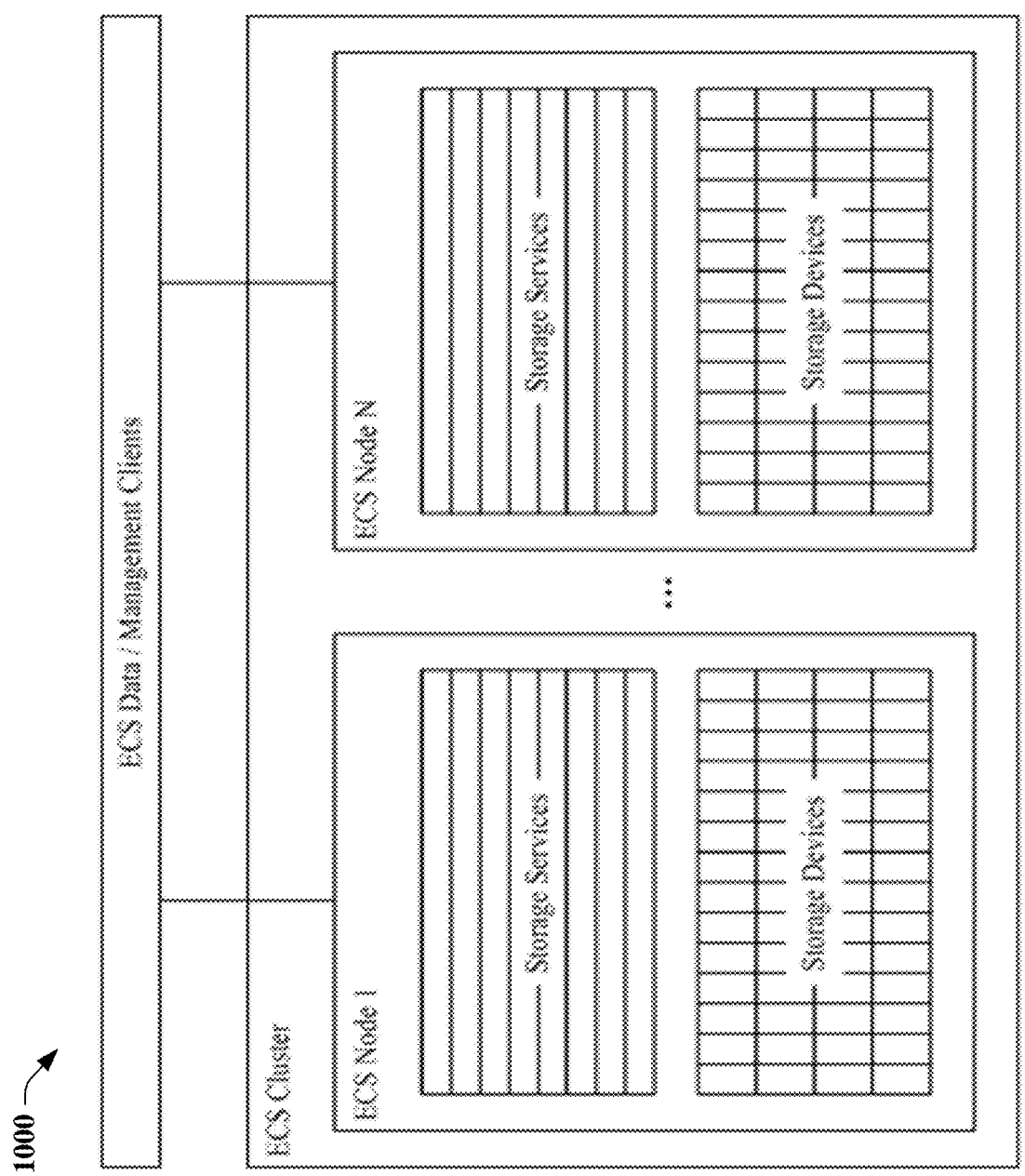
FIG. 10 illustrates an elastic cloud storage (ECS) system, in accordance with various example embodiments.

FIG. 10 illustrates an ECS storage system comprising a cloud-based object storage appliance in which corresponding storage control software comprising, e.g., ECS data client(s), ECS management client(s), storage service(s), etc. and storage media, e.g., physical magnetic disk media, storage devices, etc. of respective ECS nodes of an ECS cluster, are combined as an integrated system with no access to the storage media other than through the ECS system.

In this regard, an ECS cluster comprises multiple nodes, storage nodes, ECS nodes, etc. Each node is associated with storage devices, e.g. hard drives, physical disk drives, storage media, etc. In embodiment(s), an ECS node executing on a hardware appliance can be communicatively coupled, connected, cabled to, etc., e.g., 15 to 120 storage devices. Further, each ECS node can execute one or more services for performing data storage operations described herein.

The ECS system is an append-only virtual storage platform that protects content from being erased or overwritten for a specified retention period. In particular, the ECS system does not employ traditional data protection schemes like mirroring or parity protection. Instead, the ECS system utilizes erasure coding for data protection, wherein data, a portion of the data, e.g., a data chunk, is broken into fragments, and expanded and encoded with redundant data pieces and then stored across a set of different locations or storage media, e.g., across different storage nodes.

The ECS system can support storage, manipulation, and/or analysis of unstructured data on a massive scale on commodity hardware. As an example, the ECS can support mobile, cloud, big data, and/or social networking applications. In another example, the ECS can be deployed as a turnkey storage appliance, or as a software product that can be installed on a set of qualified commodity servers and disks, e.g., within a node, data storage node, etc. of a cluster, data storage cluster, etc. In this regard, the ECS can comprise a cloud platform that comprises at least the following features: (i) lower cost than public clouds; (ii) unmatched combination of storage efficiency and data access; (iii) anywhere read/write access with strong consistency that simplifies application development; (iv) no single point of failure to increase availability and performance; (v) universal accessibility that eliminates storage silos and inefficient extract, transform, load (ETL)/data movement processes; etc.

In embodiment(s), the cloud-based data storage system can comprise an object storage system, e.g., a file system comprising, but not limited to comprising, a Dell EMC® Isilon file storage system. As an example, a storage engine can write all object-related data, e.g., user data, metadata, object location data, etc. to logical containers of contiguous disk space, e.g., such containers comprising a group of blocks of fixed size (e.g.., 128 MB) known as chunks. Data is stored in the chunks and the chunks can be shared, e.g., one chunk can comprise data fragments of different user objects. Chunk content is modified in append-only mode, e.g., such content being protected from being erased or overwritten for a specified retention period. When a chunk becomes full enough, it is sealed, closed, etc. In this regard, content of a sealed, closed, etc. chunk is immutable, e.g., read-only, and after the chunk is closed, the storage engine performs erasure-coding on the chunk.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As utilized herein, the terms "logic," "logical," "logically," and the like are intended to refer to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

As utilized herein, terms "component," "system," "engine", and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server, client, etc. and the server, client, etc. can be a component. One or more components can reside within a process, and a component can be localized on one computer and/or distributed between two or more computers.

Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. In yet another example, a component can be an apparatus that provides specific functionality through electronic components without mechanical parts; the electronic components can comprise one or more processors therein to execute software and/or firmware that confer(s), at least in part, the functionality of the electronic components.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, the systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can comprise, but are not limited to: random access memory (RAM); read only memory (ROM); electrically erasable programmable read only memory (EEPROM); flash memory or other memory technology (e.g., card, stick, key drive, thumb drive, smart card); solid state drive (SSD) or other solid-state storage technology; optical disk storage (e.g., compact disk (CD) read only memory (CD ROM), digital video/versatile disk (DVD), Blu-ray disc); cloud-based (e.g., Internet based) storage; magnetic storage (e.g., magnetic cassettes, magnetic tape, magnetic disk storage or other magnetic storage devices); a virtual device that emulates a storage device and/or any of the above computer-readable media; or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used to determine probabilistic likelihoods that code paths utilize operating system synchronization mechanism, as described herein.

A classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to infer an action that a user desires to be automatically performed. In the case of communication systems, for example, attributes can be information received from access points, servers, components of a wireless communication network, etc., and the classes can be categories or areas of interest (e.g., levels of priorities). A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

In accordance with various aspects of the subject specification, artificial intelligence based systems, components, etc. can employ classifiers that are explicitly trained, e.g., via a generic training data, etc. as well as implicitly trained, e.g., via observing characteristics of communication equipment, e.g., a server, etc., receiving reports from such communication equipment, receiving operator preferences, receiving historical information, receiving extrinsic information, etc. For example, support vector machines can be configured via a learning or training phase within a classifier constructor and feature selection module. Thus, the classifier(s) can be used by an artificial intelligence system to automatically learn and perform a number of functions, e.g., performed by upgrade engine 302.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," "storage medium," "socket", and substantially any other information storage component relevant to operation and functionality of a system, component, and/or process, can refer to "memory components," or entities embodied in a "memory," or components comprising the memory. It will be appreciated that the memory components described herein can be either volatile memory or nonvolatile memory, or can comprise both volatile and nonvolatile memory.

By way of illustration, and not limitation, nonvolatile memory, for example, can be included in a data storage cluster, non-volatile memory 1122 (see below), disk storage 1124 (see below), and/or memory storage 1146 (see below). Further, nonvolatile memory can be included in read only memory (ROM), programmable ROM (PROM), electrically programmable ROM (EPROM), electrically erasable ROM (EEPROM), or flash memory. Volatile memory 1120 can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 11:
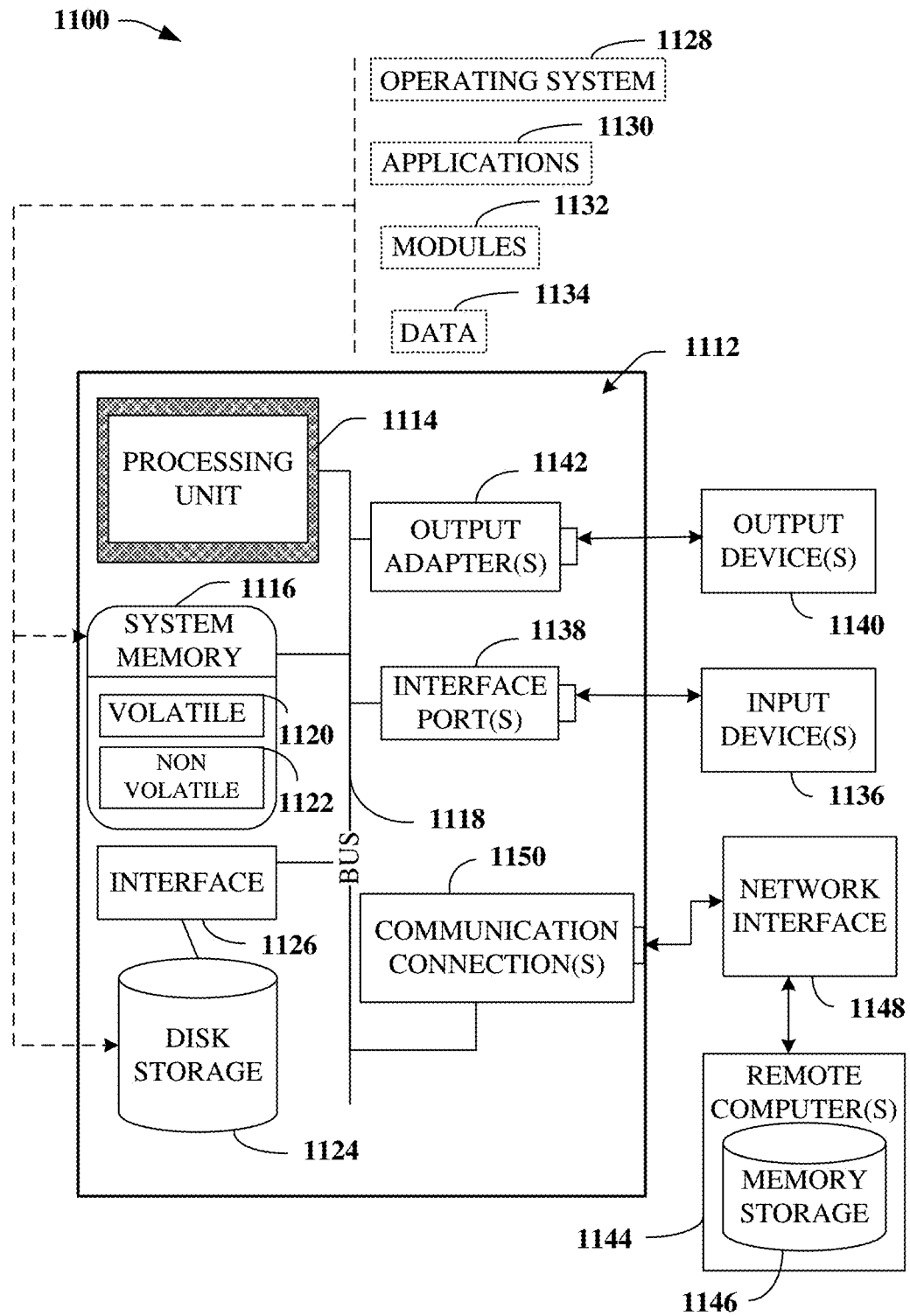
FIG. 11 illustrates a block diagram representing an illustrative non-limiting computing system or operating environment in which one or more aspects of various embodiments described herein can be implemented.

In order to provide a context for the various aspects of the disclosed subject matter, FIG. 11, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that various embodiments disclosed herein can be implemented in combination with other program modules. Generally, program modules comprise routines, programs, components, data structures, etc. that perform particular tasks and/or implement particular abstract data types.

Moreover, those skilled in the art will appreciate that the inventive systems can be practiced with other computer system configurations, comprising single-processor or multiprocessor computer systems, computing devices, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communication network; however, some if not all aspects of the subject disclosure can be practiced on stand-alone computers. In a distributed computing environment, program modules can be located in both local and remote memory storage devices.

With reference to FIG. 11, a block diagram of a computing system 1100, e.g., system 200, operable to execute the disclosed systems and methods is illustrated, in accordance with an embodiment. Computer 1112 comprises a processing unit 1114, a system memory 1116, and a system bus 1118. System bus 1118 couples system components comprising, but not limited to, system memory 1116 to processing unit 1114. Processing unit 1114 can be any of various available processors. Dual microprocessors and other multiprocessor architectures also can be employed as processing unit 1114.

System bus 1118 can be any of several types of bus structure(s) comprising a memory bus or a memory controller, a peripheral bus or an external bus, and/or a local bus using any variety of available bus architectures comprising, but not limited to, industrial standard architecture (ISA), micro-channel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCMCIA), Firewire (IEEE 1394), small computer systems interface (SCSI), and/or controller area network (CAN) bus used in vehicles.

System memory 1116 comprises volatile memory 1120 and nonvolatile memory 1122. A basic input/output system (BIOS), containing routines to transfer information between elements within computer 1112, such as during start-up, can be stored in nonvolatile memory 1122. By way of illustration, and not limitation, nonvolatile memory 1122 can comprise ROM, PROM, EPROM, EEPROM, or flash memory. Volatile memory 1120 comprises RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 also comprises removable/non-removable, volatile/non-volatile computer storage media. FIG. 11 illustrates, for example, disk storage 1124. Disk storage 1124 comprises, but is not limited to, devices like a magnetic disk drive, floppy disk drive, tape drive, Jaz drive, Zip drive, LS-100 drive, flash memory card, or memory stick. In addition, disk storage 1124 can comprise storage media separately or in combination with other storage media comprising, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to system bus 1118, a removable or non-removable interface is typically used, such as interface 1126.

It is to be appreciated that FIG. 11 describes software that acts as an intermediary between users and computer resources described in suitable operating environment 1100. Such software comprises an operating system 1128. Operating system 1128, which can be stored on disk storage 1124, acts to control and allocate resources of computer system 1112. System applications 1130 take advantage of the management of resources by operating system 1128 through program modules 1132 and program data 1134 stored either in system memory 1116 or on disk storage 1124. It is to be appreciated that the disclosed subject matter can be implemented with various operating systems or combinations of operating systems.

A user can enter commands or information into computer 1112 through input device(s) 1136. Input devices 1136 comprise, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1114 through system bus 1118 via interface port(s) 1138. Interface port(s) 1138 comprise, for example, a serial port, a parallel port, a game port, a universal serial bus (USB), a wireless based port, e.g., Wi-Fi, Bluetooth, etc. Output device(s) 1140 use some of the same type of ports as input device(s) 1136.

Thus, for example, a USB port can be used to provide input to computer 1112 and to output information from computer 1112 to an output device 1140. Output adapter 1142 is provided to illustrate that there are some output devices 1140, like display devices, light projection devices, monitors, speakers, and printers, among other output devices 1140, which use special adapters. Output adapters 1142 comprise, by way of illustration and not limitation, video and sound devices, cards, etc. that provide means of connection between output device 1140 and system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. Remote computer(s) 1144 can be a personal computer, a server, a router, a network PC, a workstation, a microprocessor based appliance, a peer device, or other common network node and the like, and typically comprises many or all of the elements described relative to computer 1112.

For purposes of brevity, only a memory storage device 1146 is illustrated with remote computer(s) 1144. Remote computer(s) 1144 is logically connected to computer 1112 through a network interface 1148 and then physically and/or wirelessly connected via communication connection 1150. Network interface 1148 encompasses wire and/or wireless communication networks such as local-area networks (LAN) and wide-area networks (WAN). LAN technologies comprise fiber distributed data interface (FDDI), copper distributed data interface (CDDI), Ethernet, token ring and the like. WAN technologies comprise, but are not limited to, point-to-point links, circuit switching networks like integrated services digital networks (ISDN) and variations thereon, packet switching networks, and digital subscriber lines (DSL).

Communication connection(s) 1150 refer(s) to hardware/software employed to connect network interface 1148 to bus 1118. While communication connection 1150 is shown for illustrative clarity inside computer 1112, it can also be external to computer 1112. The hardware/software for connection to network interface 1148 can comprise, for example, internal and external technologies such as modems, comprising regular telephone grade modems, cable modems and DSL modems, wireless modems, ISDN adapters, and Ethernet cards.

The computer 1112 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1112 can connect to other devices/networks by way of antenna, port, network interface adaptor, wireless access point, modem, and/or the like.

The computer 1112 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This comprises at least Wi-Fi and Bluetooth wireless technologies. Thus, the communication can be a predefined structure as with a conventional network or simply an ad hoc communication between at least two devices.

Wi-Fi allows connection to the Internet from a desired location (e.g., a vehicle, couch at home, a bed in a hotel room, or a conference room at work, etc.) without wires. Wi-Fi is a wireless technology similar to that used in a cell phone that enables such devices, e.g., mobile phones, computers, etc., to send and receive data indoors and out, anywhere within the range of a base station. Wi-Fi networks use radio technologies called IEEE 802.11 (a, b, g, etc.) to provide secure, reliable, fast wireless connectivity. A Wi-Fi network can be used to connect communication devices (e.g., mobile phones, computers, etc.) to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
   a processor; and
   a memory that stores executable instructions that, when executed by the processor, facilitate performance of operations, comprising:
   determining a product feature associated with a software product based on tag data;
   generating an advertising bit mask representing the product feature, wherein the advertising bit mask comprises a generation string representing a generation number associated with a generation of the software product and a feature string representing a group of features associated with the generation of the software product, and wherein the generation number comprises a default generation value that is determined as a function of determining that a value associated the group of features equals the default generation value; and
   broadcasting the advertising bit mask.

2. The system of claim 1, wherein the operations further comprise initiating the determining in response to a network connection being established to a device of a network of devices.

3. The system of claim 1, wherein the tag data represents software product version data.

4. The system of claim 1, wherein the tag data represents software product release data.

5. The system of claim 4, wherein the operations further comprise retrieving the tag data from a data structure stored on a database device of database devices.

6. The system of claim 5, wherein the data structure is a globally accessible data structure that permits collaborative editing of the globally accessible data structure.

7. The system of claim 5, wherein the data structure is a globally accessible data structure that permits collaborative editing of content of the globally accessible data structure.

8. A method, comprising:
   determining, by a device comprising a processor, a software product feature associated with a software product based on tag data;
   generating, by the device, an advertising bit mask representing the software product feature, wherein the advertising bit mask comprises a generation string representing a generation number associated with a generation of the software product and a feature string representing a group of features associated with the generation of the software product, and wherein the generation number comprises a default generation value that is determined as a function of determining that a value associated the group of features equals the default generation value; and broadcasting, by the device, the advertising bit mask.

9. The method of claim 8, further comprising initiating, by the device, the determining in response to a network establishment to a network of devices.

10. The method of claim 8, wherein the advertising bit mask represents at least a software product release data and software product feature data associated with the software product.

11. The method of claim 8, wherein the tag data represents software product release data associated with the software product.

12. The method of claim 11, further comprising retrieving, by the device, the tag data from a data structure stored on a database device of database devices.

13. The method of claim 12, wherein the data structure is a globally accessible data structure that permits collaborative editing of the globally accessible data structure.

14. The method of claim 12, wherein the data structure is a globally accessible data structure that permits collaborative editing of content of the globally accessible data structure, wherein the content represents software product version data associated with the software product.

15. A machine-readable storage medium comprising instructions that, in response to execution, cause a system comprising a processor to perform operations, comprising:

in response to establishing a network connection to a group of networked devices, determining a software product feature associated with a software product based on tag data;

generating an advertising bit mask representing the software product feature, wherein the advertising bit mask comprises a generation string representing a generation number associated with a generation of the software product and a feature string representing a group of features associated with the generation of the software product, and wherein the generation number comprises a default generation value that is determined as a function of determining that a value associated the group of features equals the default generation value; and broadcasting the advertising bit mask.

16. The machine-readable storage medium of claim 15, wherein the tag data represents software product version data, software product release data, and software product feature data.

17. The machine-readable storage medium of claim 15, wherein the tag data represents software product release data or software product feature data associated with the software product feature.

18. The machine-readable storage medium of claim 17, wherein the operations further comprise obtaining the tag data from a data structure stored on a database device of a group of database devices.

19. The machine-readable storage medium of claim 18, wherein the data structure is a globally accessible data structure that permits collaborative editing of the globally accessible data structure.

20. The machine-readable storage medium of claim 18, wherein the data structure is a globally accessible data structure that permits collaborative editing of content of the globally accessible data structure, wherein the content comprises the tag data.

\* \* \* \* \*